United States Patent
Lee (10) Patent No.: US 11,560,176 B2
(45) Date of Patent: Jan. 24, 2023

(54) DRIVER ASSISTANCE APPARATUS AND METHOD THEREOF

(71) Applicant: MANDO CORPORATION, Pyeongtaek-si (KR)

(72) Inventor: Minchae Lee, Seoul (KR)

(73) Assignee: HL Klemove Corp., Incheon (KR)

( * ) Notice: Subject to any disclaimer, the term of this patent is extended or adjusted under 35 U.S.C. 154(b) by 271 days.

(21) Appl. No.: 17/016,779

(22) Filed: Sep. 10, 2020

(65) Prior Publication Data

US 2021/0070359 A1 Mar. 11, 2021

(30) Foreign Application Priority Data

Sep. 11, 2019 (KR) .................. 10-2019-0112681

(51) Int. Cl.
*B62D 15/02* (2006.01)
*B60R 11/04* (2006.01)
(Continued)

(52) U.S. Cl.
CPC .......... *B62D 15/026* (2013.01); *B60R 11/04* (2013.01); *B60T 7/12* (2013.01); *G06V 20/58* (2022.01);
(Continued)

(58) Field of Classification Search
CPC ..... B62D 15/026; B62D 15/025; B60R 11/04; B60R 2011/0003; B60R 2011/004;
(Continued)

(56) References Cited

U.S. PATENT DOCUMENTS

2002/0140562 A1* 10/2002 Gutta ................ G08G 1/166
348/148
2004/0239509 A1* 12/2004 Kisacanin ............ G08B 21/06
340/575
(Continued)

FOREIGN PATENT DOCUMENTS

DE   10 2010 013 243 A1   9/2011
DE   10 2013 016 488 A1   4/2015
(Continued)

OTHER PUBLICATIONS

Office Action issued in corresponding German Patent Application No. 10 2020 123 658.1, dated Dec. 14, 2021.

*Primary Examiner* — Richard M Camby
(74) *Attorney, Agent, or Firm* — Morgan, Lewis & Bockius LLP (57) ABSTRACT

A driver assistance apparatus includes an external camera disposed at a vehicle so as to have an outer field of view of the vehicle, configured to obtain image data on the outer field of view of the vehicle; an internal camera disposed inside the vehicle to grasp a drivers gaze on board the vehicle, configured to obtain the drivers gaze data; and a controller including at least one processor configured to process the image data and the gaze data. The controller may be configured to grasp the driver's gaze based on the gaze data, and based on a determination that the driver is in a careless condition, to control at least one of a control timing of a steering device and a lateral distance limit value for operating the steering device to be changed.

20 Claims, 7 Drawing Sheets

(51) Int. Cl.
  *B60T 7/12* (2006.01)
  *G06V 20/58* (2022.01)
  *G06V 20/59* (2022.01)
  *G06V 40/19* (2022.01)
  *B60R 11/00* (2006.01)
(52) U.S. Cl.
  CPC ............ *G06V 20/597* (2022.01); *G06V 40/19* (2022.01); *B60R 2011/0003* (2013.01); *B60R 2011/004* (2013.01); *B60T 2210/00* (2013.01); *B60T 2220/02* (2013.01)
(58) Field of Classification Search
  CPC .... B60T 7/12; B60T 2210/00; B60T 2220/02; B60T 7/22; B60T 2201/022; G06V 20/58; G06V 20/597; G06V 40/19; G06V 20/588; B60W 30/12; B60W 30/09; B60W 40/09; B60W 2540/225; B60W 40/08; B60W 10/18; B60W 10/20; B60W 30/181; B60W 40/02; B60W 2040/0818; B60W 2420/42; B60W 2520/04; B60W 2520/06; B60Y 2300/18091
  See application file for complete search history.

(56) References Cited

U.S. PATENT DOCUMENTS

| | | | |
|---|---|---|---|
| 2005/0030184 A1* | 2/2005 | Victor | B60K 35/00 340/576 |
| 2007/0280505 A1* | 12/2007 | Breed | B60W 40/08 382/104 |
| 2009/0261979 A1* | 10/2009 | Breed | G01S 15/88 340/576 |
| 2014/0204193 A1* | 7/2014 | Zhang | G06V 40/18 348/78 |

FOREIGN PATENT DOCUMENTS

| | | |
|---|---|---|
| DE | 10 2015 206 200 A1 | 10/2016 |
| EP | 2 253 499 B1 | 7/2012 |
| EP | 3 100 927 A1 | 12/2016 |

* cited by examiner

DRIVER ASSISTANCE APPARATUS AND METHOD THEREOF

CROSS-REFERENCE TO RELATED APPLICATION(S)

This application is based on and claims priority under 35 U.S.C. § 119 to Korean Patent Application No. 10-2019-0112681, filed on Sep. 11, 2019 in the Korean Intellectual Property Office, the disclosure of which is incorporated by reference in its entirety.

TECHNICAL FIELD

The disclosure relate to a driver assistance apparatus, and more particularly, to the driver assistance apparatus capable of reflecting a driver's attention condition.

BACKGROUND

Existing advanced driver assistance systems (ADAS) performed control based on lane information outside a vehicle and object information outside the vehicle. For example, a Lane keeping Assistance System (LKAS) controls to maintain a lane based on the object information and the lane information obtained from an image outside the vehicle. In addition, an automatic emergency braking system prevents a collision based on the object information outside the vehicle and motion information of the vehicle by a driver.

However, since the existing ADAS does not consider the driver's condition, it is insufficient to prevent accidents except in typical situations.

SUMMARY

An aspect of the disclosure is to provide a driver assistance apparatus that reflects a driver's condition, and a method of controlling the driver assistance apparatus.

Additional aspects of the disclosure will be set forth in part in the description which follows and, in part, will be obvious from the description, or may be learned by practice of the disclosure.

In accordance with an aspect of the disclosure, a driver assistance apparatus includes an external camera disposed at a vehicle so as to have an outer field of view of the vehicle, configured to obtain image data on the outer field of view of the vehicle; an internal camera disposed inside the vehicle to grasp a driver's gaze on board the vehicle, configured to obtain the driver's gaze data; and a controller including at least one processor configured to process the image data and the gaze data. The controller may be configured to grasp the driver's gaze based on the gaze data, and based on a determination that the driver is in a careless condition, to control at least one of a control timing of a steering device and a lateral distance limit value for operating the steering device to be changed.

When the driver's gaze is not in front, the controller may be configured to determine that the driver is in the careless condition, and to control the control timing of the steering device to advance by a preset time compared to an existing control timing.

When the driver's gaze is not in front, the controller may be configured to determine that the driver is in the careless condition, and to change the lateral distance limit value to a value smaller than an existing lateral distance limit value.

When an object detected from the outside of the vehicle exists within the driver's gaze area, the controller may be configured to determine that the driver is not in the careless condition, and not to intervene in control of the steering device.

When an object detected from the outside of the vehicle does not exist within the driver's gaze area, the controller may be configured to determine that the driver is in the careless condition.

The internal camera may be configured to obtain the driver's gaze data based on the driver's face direction and the driver's pupil direction.

The driver assistance apparatus may further include the steering device configured to change a driving direction of the vehicle. The steering device may be configured to change the driving direction of the vehicle according to a control signal changed by the controller.

The driver assistance apparatus may further include a brake device configured to decelerate the vehicle or stop the vehicle. When the driver's gaze is not in front, the controller may be configured to determine that the driver is in the careless condition, and to control a control timing of the brake device to advance by a preset time compared to an existing control timing.

The driver assistance apparatus may further include a brake device configured to decelerate the vehicle or stop the vehicle. When the driver's gaze is not in front, the controller may be configured to determine that the driver is in the careless condition, and to control a braking torque amount of the brake device to be higher than an existing braking torque amount.

In accordance with another aspect of the disclosure, a method of controlling a driver assistance apparatus includes obtaining, by an external camera, image data on the outer field of view of a vehicle; obtaining, by an internal camera, a driver's gaze data to grasp the driver's gaze on board the vehicle; and grasping, by a controller, the drivers gaze based on the gaze data, and based on a determination that the driver is in a careless condition, controlling at least one of a control timing of a steering device and a lateral distance limit value for operating the steering device to be changed.

The controlling may include, when the driver's gaze is not in front, determining that the driver is in the careless condition, and controlling the control timing of the steering device to advance by a preset time compared to an existing control timing.

The controlling may include, when the driver's gaze is not in front, determining that the driver is in the careless condition, and changing the lateral distance limit value to a value smaller than an existing lateral distance limit value.

The controlling may include, when an object detected from the outside of the vehicle exists within the driver's gaze area, determining that the driver is not in the careless condition, and not intervening in control of the steering device.

The controlling may include, when an object detected from the outside of the vehicle does not exist within the driver's gaze area, determining that the driver is in the careless condition.

The gaze data may include information about the driver's face direction and the driver's pupil direction.

The method may further include the steering device configured to change a driving direction of the vehicle. The controlling may include controlling the steering device to change the driving direction of the vehicle according to the changed control signal.

The method may further include a brake device configured to decelerate the vehicle or stop the vehicle. The controlling may include, when the driver's gaze is not in front, determining that the driver is in the careless condition, and controlling a control timing of the brake device to advance by a preset time compared to an existing control timing.

The method may further include a brake device configured to decelerate the vehicle or stop the vehicle. The controlling may include, when the driver's gaze is not in front, determining that the driver is in the careless condition, and controlling a braking torque amount of the brake device to be higher than an existing braking torque amount.

In accordance with another aspect of the disclosure, a non-transitory computer readable medium containing program instructions executed by a processor, the computer readable medium includes program instructions that obtain, by an external camera, image data on the outer field of view of a vehicle; program instructions that obtain, by an internal camera, a driver's gaze data to grasp the driver's gaze on board the vehicle; and program instructions that grasp, by a controller, the driver's gaze based on the gaze data, and based on a determination that the driver is in a careless condition, control at least one of a control timing of a steering device and a lateral distance limit value for operating the steering device to be changed.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals refer to like elements throughout the specification. Not all elements of the embodiments of the disclosure will be described, and the description of what are commonly known in the art or what overlap each other in the exemplary embodiments will be omitted.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

It is to be understood that the singular forms "a," "an," and "the" include plural references unless the context clearly dictates otherwise.

As used herein, the terms "portion," "unit," "block," "member," and "module" refer to a unit that can perform at least one function or operation. The terms may refer to an electrical circuit, and may refer to at least one process which is performed by at least one piece of hardware such as a field-programmable gate array (FPGA) and an application specific integrated circuit (ASIC), and at least one piece of software stored in a memory or a processor.

Reference numerals used for method steps are merely used for convenience of explanation, but not to limit an order of the steps. Thus, unless the context clearly dictates otherwise, the written order may be practiced otherwise.

Hereinafter, embodiments of a driver assistance apparatus and a method of controlling the driver assistance apparatus will be described in detail with reference to the accompanying drawings.

Figure 1:
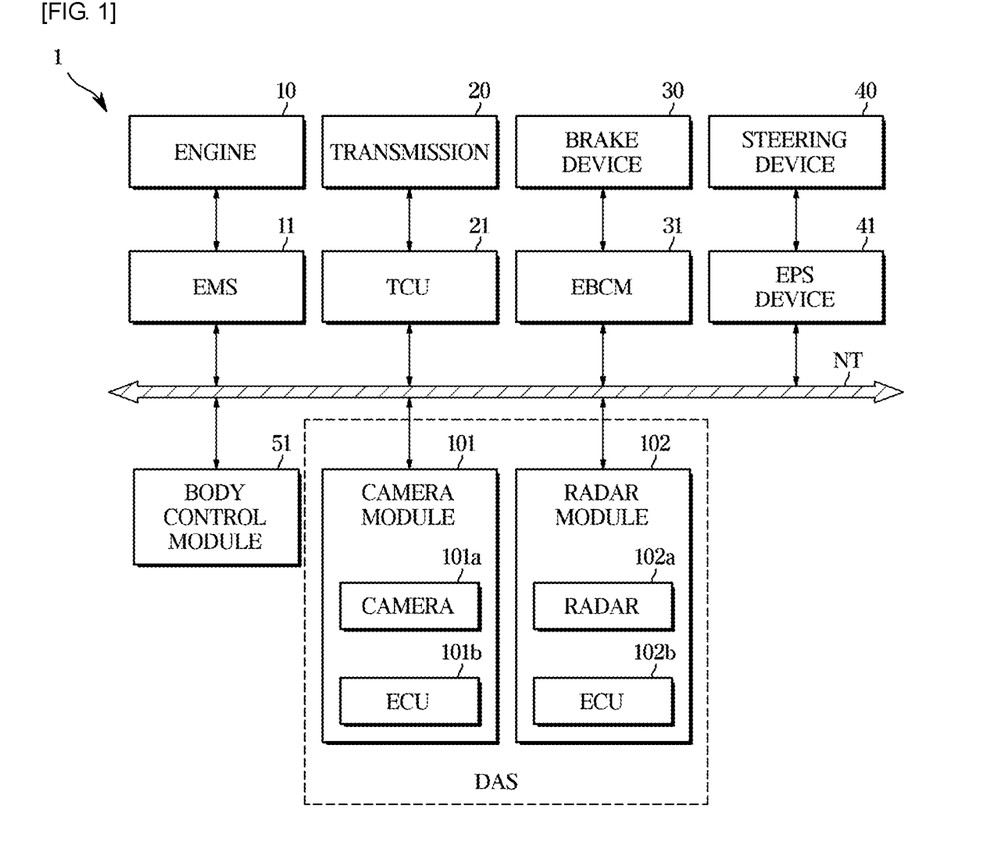
FIG. 1 is a block diagram illustrating components of a vehicle according to an embodiment.

FIG. 1 is a block diagram illustrating components of a vehicle according to an embodiment.

As illustrated in FIG. 1, a vehicle 1 may include an engine 10, a transmission 20, a brake device 30, and a steering device 40. The engine 10 may include at least one cylinder and at least one piston, and may generate power needed to drive the vehicle 1. The transmission 20 may include a plurality of gears, and may transmit power generated by the engine 10 to wheels of the vehicle 1. The brake device 30 may decelerate or stop the vehicle 1 through frictional force on wheels. The brake device 30 may include one or more brake pads and brake shoes operative to decelerate or stop the vehicle. The steering device 40 may change a driving direction of the vehicle 1.

The vehicle 1 may include a plurality of electronic constituent elements. For example, the vehicle 1 may further include an Engine Management System (EMS) 11, a Transmission Controller also referred to as a Transmission Control Unit (TCU) 21, an Electronic Brake Controller also referred to as an Electronic Brake Control Module (EBCM) 31, an Electronic Power Steering (EPS) device 41, a Body Control Module (BCM), and a driver assistance apparatus 100.

The EMS 11 may control the engine 10 in response to either the driver's acceleration intention from the acceleration pedal or a request signal from the driver assistance apparatus 100. For example, the EMS 11 may control torque of the engine 10.

The TCU 21 may control the transmission 20 in response to either a driver's gearshift command activated by a gearshift lever and/or a driving speed of the vehicle 1. For example, the TCU 21 may adjust or regulate a gearshift ratio from the engine 10 to wheels of the vehicle 1.

The EBCM 31 may control a brake device 30 in response to either the driver's brake intention from a brake pedal or slippage of wheels. For example, the EBCM 31 may temporarily release wheel braking in response to wheel slippage detected in a braking mode of the vehicle 1, resulting in implementation of an Anti-lock Braking System (ABS). The EBCM 31 may selectively release braking of wheels in response to oversteering and/or understeering detected in a steering mode of the vehicle 1, resulting in implantation of Electronic Stability Control (ESC). In addition, the EBCM 31 may temporarily brake wheels in response to wheel slippage detected by vehicle driving, resulting in implementation of a Traction Control System (TCS).

The EPS device 41 may assist the steering device 40 in response to the driver's steering intention from the steering wheel, such that the EPS device 41 may assist the driver in easily handling the steering wheel. For example, the EPS device 41 may assist the steering wheel 40 in a manner that steering force decreases in a low-speed driving mode or a parking mode of the vehicle 1 but increases in a high-speed driving mode of the vehicle 1.

A body control module 51 may control various electronic components that are capable of providing the driver with user convenience or guaranteeing driver safety. For example, the body control module 51 may control headlamps (headlights), wipers, an instrument or other cluster, a multifunctional switch, turn signal indicators, or the like.

The driver assistance apparatus 100 may assist the driver in easily handling (e.g., driving, braking, and steering) the vehicle 1. For example, the driver assistance apparatus 100 may detect peripheral environments (e.g., a peripheral vehicle, pedestrian, cyclist, lane, traffic sign, or the like) of the vehicle 1 (i.e., vehicle itself), and may perform driving, braking, and/or steering of the vehicle 1 in response to the detected peripheral environments.

The driver assistance apparatus 100 may provide the driver with various functions. For example, the driver assistance apparatus 100 may provide the driver with a Lane Departure Warning (LDW) function, a Lane Keeping Assist (LKA) function, a High Beam Assist (HBA) function, an Autonomous Emergency Braking (AEB) function, a Traffic Sign Recognition (TSR) function, a Smart Cruise Control (SCC) function, a Blind Spot Detection (BSD) function, or the like.

The driver assistance apparatus 100 may include a camera module 101 operative to obtain image data of a peripheral area of the vehicle 1 (e.g., a area outside of and surrounding the vehicle 1), and a radar module 102 operative to obtain data about a peripheral object present in the peripheral area of the vehicle 1.

The camera module 101 may include a camera 101*a* or multiple cameras and an Electronic Control Unit (ECU) controller 101*b*. The camera 101*a* may capture an image including a forward area of the vehicle 1 (e.g., a area in front of the vehicle 1), and may include an image processor operative to process the captured image to recognize peripheral vehicles, pedestrians, cyclists, lanes, traffic signs, or the like in the captured image.

The radar module 102 may include a radar 102*a* or multiple radars and an Electronic Control Unit (ECU) controller 102*b*, and may obtain or determine a relative position, a relative speed, or the like of the peripheral object (e.g., a peripheral vehicle, a pedestrian, or a cyclist) of the vehicle 1 based on sensed radar data.

The above-mentioned electronic components may communicate with each other through a vehicle communication network (NT). For example, the electronic components may perform data communication through Ethernet, Media Oriented Systems Transport (MOST), a FlexRay, a Controller Area Network (CAN), a Local Interconnect Network (LIN), or the like. For example, the driver assistance apparatus 100 may respectively transmit a drive control signal, a brake signal, and a steering signal to the EMS 11, the EBCM 31, and the EPS device 41 over the vehicle communication network (NT).

Figure 2:
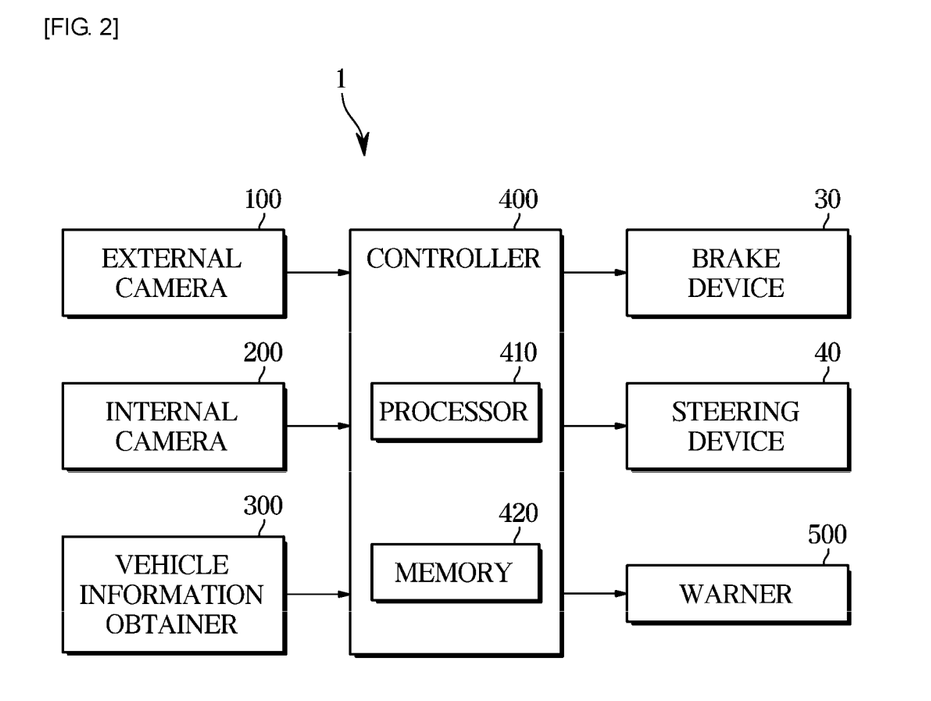
FIG. 2 is a block diagram illustrating a driver assistance system according to an embodiment.

FIG. 2 is a block diagram illustrating a driver assistance system according to an embodiment.

The vehicle 1 may include an external camera 100 for obtaining an outer field of view of the vehicle 1 and capturing objects and roads in the outer field of view, an internal camera 200 for obtaining the driver's gaze data, a vehicle information obtainer 300 for obtaining a state of the vehicle 1, a controller 400, the brake device 30, the steering device 40, and a warner 500.

The external camera 100 may include a Field of View (FOV) 110*a* oriented to the forward area of the vehicle 1. The external camera 100 may be installed at a windshield of the vehicle 1.

The external camera 100 may capture an image of the forward area of the vehicle 1, and may obtain data of the forward-view image of the vehicle 1. The forward-view image data of the vehicle 1 may include information about the position of a peripheral vehicle, a pedestrian, a cyclist, or a lane located in the forward area of the vehicle 1.

The external camera 100 may include a plurality of lenses and a plurality of image sensors. Each image sensor may include a plurality of photodiodes to convert light into electrical signals, and the photodiodes may be arranged in a two-dimensional (2D) matrix.

The external camera 100 may be electrically coupled to the processor or the controller 140. For example, the external camera 100 may be connected to the controller 140 through a vehicle communication network (NT), Hardwires, or a Printed Circuit Board (PCB).

The external camera 100 may transmit the forward-view image data of the vehicle 1 to the controller 140.

The internal camera 200 may be a camera installed inside the vehicle 1 to capture the driver's face. Accordingly, the internal camera 200 may obtain the gaze data by capturing the driver's face. The internal camera 200 may include various capturing devices capable of providing data for image processing by obtaining a driver's facial image. In addition, the internal camera 200 may be an infrared (IR) camera to accurately obtain the driver's facial image even when driving at night. The internal camera 200 may be installed at various positions inside the vehicle 1, but may be installed in a single row space with a driver's seat and a passenger seat such as a cluster and a center fascia in order to easily grasp the driver's gaze.

The internal camera 200 may transmit driver's gaze data inside the vehicle 1 to the controller 400.

The vehicle information obtainer 300 may include at least one of various sensors capable of obtaining information on a speed or posture of the vehicle 1. The vehicle information obtainer 300 may include a vehicle speed sensor for detecting the speed of the vehicle 1, an acceleration sensor for detecting an acceleration of the vehicle 1, and an angular speed sensor for detecting an angular speed of the vehicle 1.

The vehicle speed sensor may be implemented as a wheel speed sensor that detects a wheel speed, and the wheel speed sensor may include a wheel speed sensor that detects the speed of at least one of the front and rear wheels of the vehicle 1.

The acceleration sensor may include a longitudinal acceleration sensor that outputs acceleration in a height direction of the vehicle 1, that is, the acceleration in a Z-axis direction, and a lateral acceleration sensor that outputs acceleration in a lateral direction of the vehicle 1, that is, the acceleration in a Y-axis direction.

The longitudinal acceleration sensor and the lateral acceleration sensor may be implemented as separate sensor modules, or may be implemented as one sensor module. The angular speed sensor may be a sensor that measures an attitude of the vehicle 1 and may also be referred to as a gyro sensor. The angular speed sensor may include a roll rate sensor that detects a rotational angular speed of the vehicle 1 in a roll direction and a yaw rate sensor that detects a rotational angular speed of the vehicle 1 in a yaw direction. The roll rate sensor and the yaw rate sensor may also be implemented as separate sensor modules, or may be implemented as one sensor module.

The brake system 32 may include the EBCM 31 (see FIG. 1) and the brake device 30 (see FIG. 1). The steering system 42 may include the EPS device 41 (see FIG. 1) and the steering device 40 (see FIG. 1).

The brake device 30 may be connected to the EBCM 31 (see FIG. 1) described with reference to FIG. 1, and the steering device 40 may be connected to the EPS device 41 (see FIG. 1) described with reference to FIG. 1.

The warner 500 may notify the driver that a control operation is started when the operation according to the control of the controller 400 is performed. The warner 500 may inform the driver of a collision risk by stimulating at least one of the driver's sight, hearing, and touch.

For example, the warner 500 may provide a display and warning sound to the driver through a human machine interface (HMI) provided in the vehicle 1, or may provide a pre-warning signal or a warning signal to the driver through a vibration generated from a haptic module provided in the vehicle 1.

The controller 400 may include a processor 410 and a memory 420.

The processor 410 may process the image data of the external camera 100 and the gaze data of the internal camera 200, and may generate a brake signal and controlling the brake device 30 and a steering signal controlling the steering device 40.

The processor 410 may calculate a Time-to-Collision (TTC) between the vehicle 1 and the preceding object based on the position information (distance) and the speed information (relative speed) of each preceding object, may compare the calculated TTC with a predetermined reference time, and may warn the driver about a high possibility of collision with the preceding object or may transmit the brake signal to the brake device 30 and the steering device 40.

In another example, the processor 410 may calculate a Distance-to-Collision (DTC) based on the speed information of each preceding object, and may warn the driver about a high possibility of collision with the preceding object or may transmit a control signal to the brake device 30 and the steering device 40 according to the result of comparison between the calculated DTC and the distance to each preceding object.

The memory 420 may store programs and/or data needed for allowing the processor 410 to process image data, may store programs and/or data needed for the processor 410 to process radar data, and may store programs and/or data needed for the processor 410 to generate a brake signal and/or a steering signal.

The memory 420 may temporarily store the image data received from the external camera 100 and/or the gaze data received from the internal camera 200, and may also temporarily store the processed results of the image data and/or the gaze data handled by the processor 410.

The memory 420 may include not only a volatile memory, such as a Static Random Access memory (SRAM) or a Dynamic Random Access Memory (DRAM), but also a non-volatile memory, such as a flash memory, a Read Only Memory (ROM), or an Erasable Programmable Read Only Memory (EPROM).

Hereinafter, a control method performed by the components of the vehicle 1 described above will be described in detail with reference to FIGS. 3 and 4.

Figure 3:
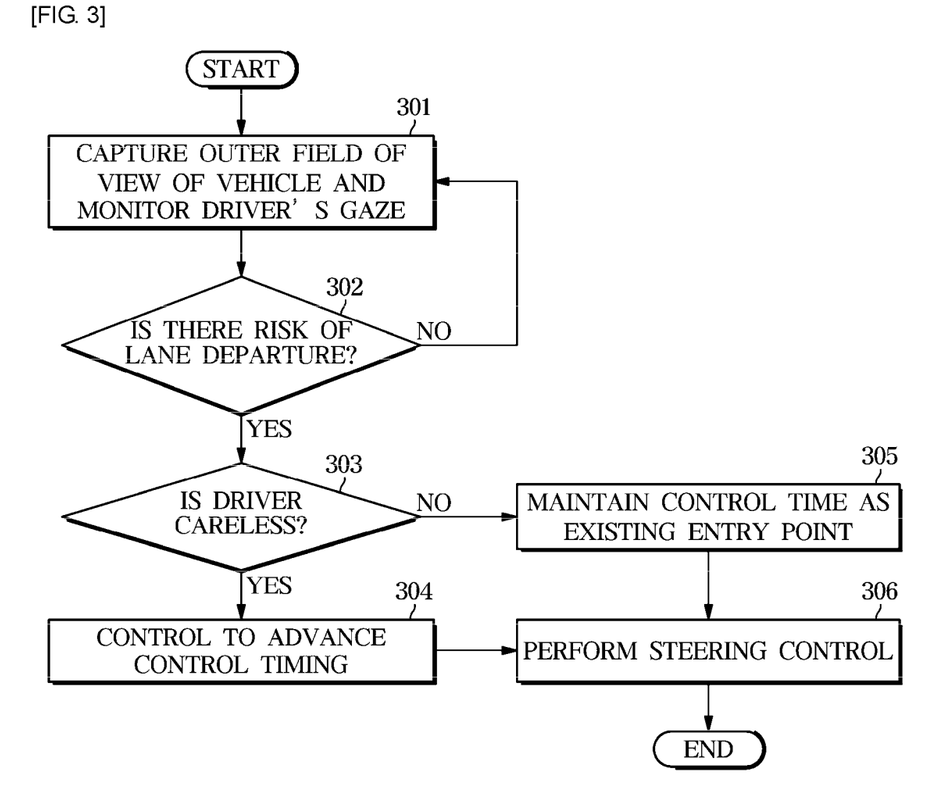
FIG. 3 is a flowchart illustrating a method of controlling a vehicle according to an embodiment.

FIG. 3 is a flowchart illustrating a method of controlling a vehicle according to an embodiment.

The controller 400 may control the external camera 100 to capture the outer field of view of the vehicle 1, and may control the internal camera 200 to monitor the driver's gaze inside the vehicle 1 (301). Then, the controller 400 may receive the image data and the gaze data obtained in operation 301. Here, the internal camera 200 may obtain the driver's gaze data based on the driver's face direction and the driver's pupil direction.

The controller 400 determines whether the vehicle 1 has a risk of lane departure based on an image data analysis (302). As a result of the determination, when there is no the risk of lane departure, the controller 400 may continuously monitor the outer field of view and the driver's gaze.

When there is the risk of lane departure, the controller 400 may determine whether the driver is in a careless condition (303). Here, the driver's careless condition may be a case where the driver's gaze does not face forward. In addition, in addition to the above-described conditions, the driver's careless condition may include all cases in which the driver's condition cannot be viewed normally, such as when the driver's pupil is not visible or an eyelid movement is different from usual. In this case, the controller 400 may store an image of the driver's gaze in the memory 420 and compare the driver's careless condition with the stored image to determine the driver's careless condition.

As a result of determining whether the driver is in the careless condition, when there is no abnormality in the driver's condition, the controller 400 may maintain an existing control state without changing an entry point of steering control or a control reference (305).

According to an embodiment, the controller 400 may determine that the driver is not the careless condition when the object detected from the outside of the vehicle 1 exists in the driver's gaze area, and may control the steering device 40 not to intervene. For example, the gaze area may be a constant-sized area based on a center of the driver's gaze direction. In this case, the gaze area may be a circular or elliptical various virtual areas. The size of the gaze area may be various sizes according to settings.

According to another embodiment, the controller 400 may determine that the driver is in the careless condition when the object detected from the outside of the vehicle 1 does not exist within the driver's gaze area.

When the driver is in the careless condition, the controller 400 may control to advance a control timing of the steering device 40 (304), and may control the steering control of the steering device 40 to be performed at the advanced control timing (306). At this time, the controller 400 may control the control timing of the steering device 40 to be changed, and control to change a lateral distance limit value for operating the steering device 40 in addition to the control timing. The related description will be described in detail with reference to FIG. 4.

According to the embodiment, when the drivers gaze is not in front, the controller 400 may determine that the driver is in the careless condition, and may control the control timing of the steering device 40 to advance by a preset time compared to the existing control timing. At this time, the control timing may be changed according to the setting. The steering device 40 may change the driving direction of the vehicle 1 by the control signal changed by the controller 400. At this time, the control signal is generated for the preset time than the existing control entry point of the steering device 40 so that the vehicle 1 does not deviate from the lane.

Figure 4:
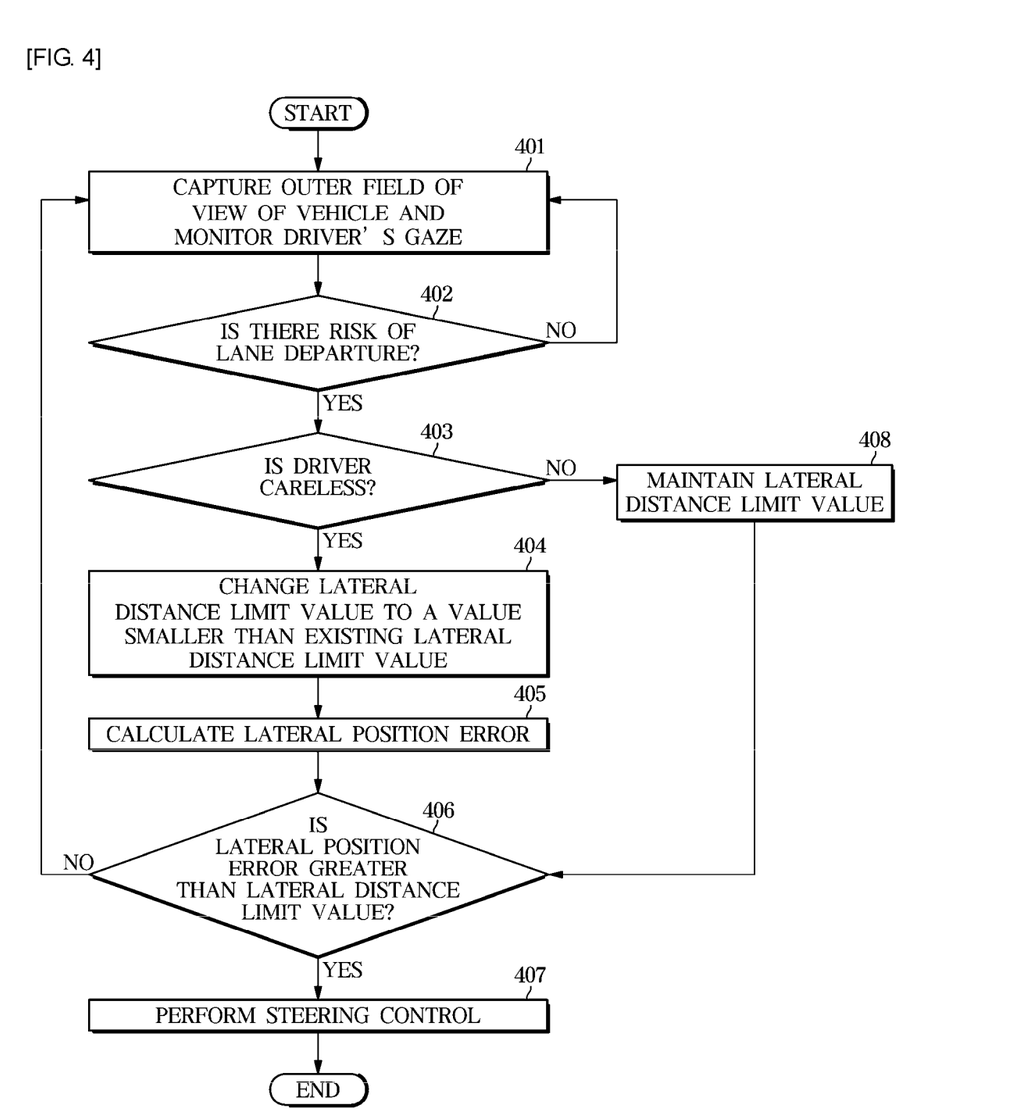
FIG. 4 is a flowchart illustrating a method of controlling a vehicle according to another embodiment.

FIG. 4 is a flowchart illustrating a method of controlling a vehicle according to another embodiment. The control method described above may reflect the driver's condition and prevent the lane departure of the vehicle 1 by advancing the control timing of the steering device 40. The control method according to FIG. 4 may reflect the driver's condition, but when the driver is in the careless condition, the standard for operating the steering device 40 is relaxed to prevent the vehicle 1 from leaving the lane early.

The controller 400 may control the external camera 100 to capture the outer field of view of the vehicle 1, and may control the internal camera 200 to monitor the driver's gaze inside the vehicle 1 (401). Then, the controller 400 may receive the image data and the gaze data obtained in operation 401. Here, the internal camera 200 may obtain the driver's gaze data based on the driver's face direction and the driver's pupil direction.

The controller 400 determines whether the vehicle 1 has a risk of lane departure based on an image data analysis (402). As the result of the determination, when there is no the risk of lane departure, the controller 400 may continuously monitor the outer field of view and the driver's gaze.

When there is the risk of lane departure, the controller 400 may determine whether the driver is in a careless condition (403). Here, the driver's careless condition may be a case where the driver's gaze does not face forward. In addition, in addition to the above-described conditions, the driver's careless condition may include all cases in which the driver's condition cannot be viewed normally, such as when the driver's pupil is not visible or an eyelid movement is different from usual. In this case, the controller 400 may store an image of the driver's gaze in the memory 420 and compare the driver's careless condition with the stored image to determine the driver's careless condition.

As the result of determining whether the driver is in the careless condition, when there is no abnormality in the driver's condition, the controller 400 may maintain the existing control state without changing the lateral distance limit value of the steering control (408). Here, the lateral distance limit value is a reference value compared with the lateral position error, which is the distance between the center point of the vehicle 1 from the center of the lane, and the controller 300 may perform the steering control when the lateral position error exceeds the lateral distance limit value. And, when the lateral position error is less than the lateral distance limit value, the controller 300 may not perform the steering control. A method of calculating the lateral position error will be described with reference to FIGS. 5 and 6.

When the driver is in the careless condition, the controller 400 may change the previously set lateral distance limit value to a smaller value (404). Accordingly, since the controller 400 performs the steering control even when the vehicle 1 is lower than an existing departure degree from the center of the lane, it is possible to prevent sudden lane departure.

When the lateral distance limit value is changed, the controller 400 may calculate the current lateral position error (405). When the lateral position error is greater than the changed lateral distance limit value (406), the controller 400 may perform the steering control so that the center of the vehicle 1 coincides with the center of the lane (407).

According to the embodiment, when the drivers gaze is not in front, the controller 400 may determine that the driver is the careless condition, and may change the lateral distance limit value to a value smaller than the existing lateral distance limit value.

Each of the control methods described above with reference to FIGS. 3 and 4 may be performed independently of each other, as well as may be performed simultaneously.

Meanwhile, in FIG. 4, the control method based on the lateral position error has been described. Hereinafter, the method of calculating the lateral position error referred to in the above-described embodiments will be described with reference to FIGS. 5 and 6.

Figure 5:
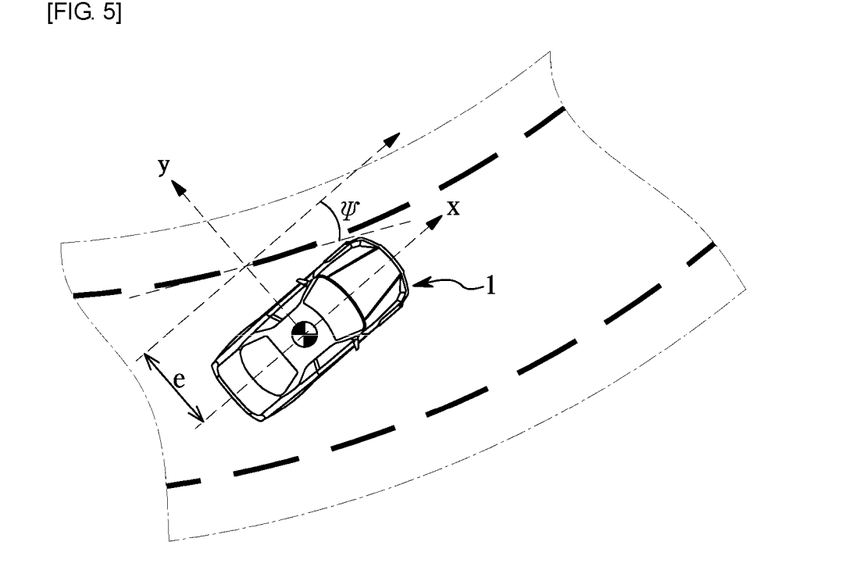
FIGS. 5 and 6 are views for describing calculation of a lateral position error.

As illustrated in FIG. 5, it is assumed that the vehicle 1 is driving between lanes, and a virtual coordinate system is set based on the center of the vehicle 1. At this time, based on a rectangular coordinate system, e indicates a lateral position assuming the vehicle 1 is stationary, Ψ indicates an angle between the vehicle 1 and the lane, and γ indicates a curvature of the lane, and $\dot{\gamma}$ indicates a rate of change of the curvature of the lane.

Figure 6:
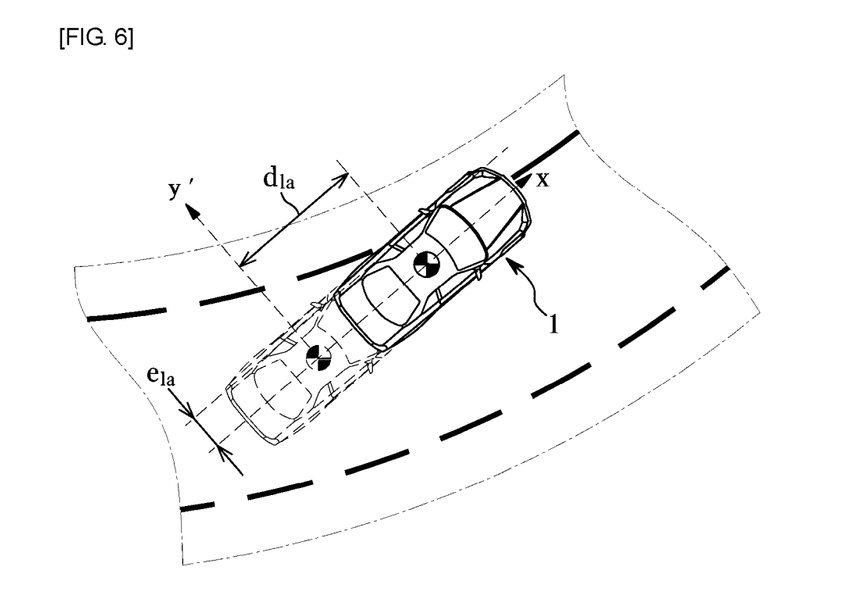

Referring to FIG. 6 and Equation 1 below, when the vehicle 1 is driving, the lateral position error of the vehicle 1 may be calculated as follows.

$$e_{la} = e + d_{la}\Psi + d_{la}^2\gamma + d_{la}^8\dot{\gamma} \qquad \text{[Equation 1]}$$

Particularly, a lateral position error ($e_{la}$) corresponds to a distance error based on the center of the lane corresponding to a future trajectory of the vehicle 1 being driven. In addition, a preset front distance ($d_{la}$) indicates an advance distance of the vehicle 1 at a time point (position) for obtaining the lateral position error.

As described in FIG. 4, steering control is performed by comparing the calculated lateral position error with an existing lateral distance limit value or a changed limit value.

Figure 7:
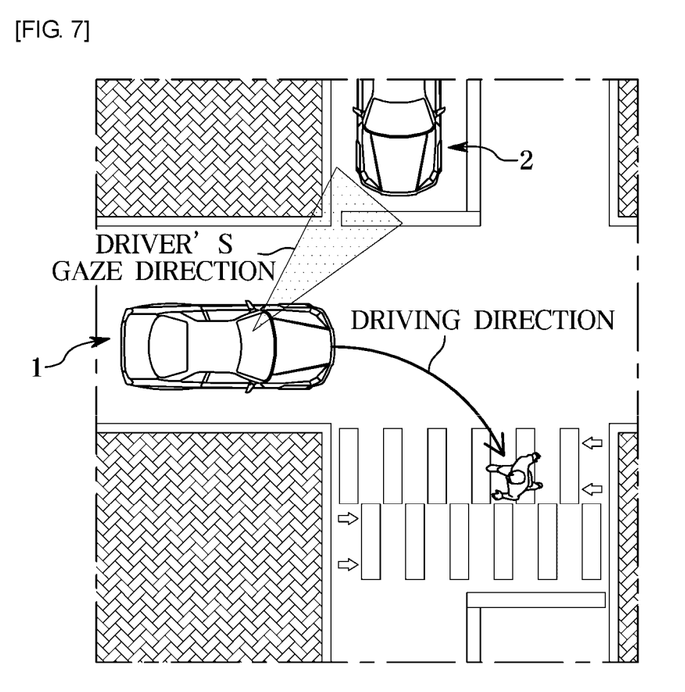
FIG. 7 is a view illustrating an example in which control of a brake device is changed.

FIG. 7 is a view illustrating an example in which control of a brake device is changed.

As described above, the disclosure may perform the steering control by grasping the driver's attention condition. In addition, according to the disclosure, it is possible to perform braking control by grasping the driver's attention condition.

The driver assistance apparatus 100 may further include the brake device 30 for decelerating the vehicle 1 or stopping the vehicle 1. Here, when the drivers gaze is not in front, the controller 400 may determine that the driver is the careless condition, and may control the control timing of the brake device 30 to advance by the preset time compared to the existing control timing. For example, as illustrated in FIG. 7, when the driver attempts to turn right at an intersection, in preparation for a case in which the driver does not recognize a pedestrian on a right turn path because the driver only looks at the other vehicle 2 coming from the left, the controller 400 may perform the braking control at a time point earlier than an existing braking control timing.

In addition, according to the embodiment, in addition to advancing the control timing of the brake device 30, the controller 400 may control a braking torque amount of the brake device 30 to be higher than an existing braking torque amount.

According to the embodiments of the disclosure, since the driver's attention condition is reflected, lane departure and collision can be prevented in unusual situations.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A driver assistance apparatus comprising:
an external camera disposed at a vehicle so as to have an outer field of view of the vehicle, and configured to obtain image data on the outer field of view of the vehicle;
an internal camera disposed inside the vehicle, and configured to obtain gaze data of a driver on board so as to grasp a driver's gaze; and
a controller including at least one processor configured to process the image data and the gaze data,
wherein the controller is configured to grasp the driver's gaze based on the gaze data,
upon determining that the driver is in a careless condition, the controller is configured to perform at least one of controlling a control timing of a steering device to be changed or controlling a lateral distance limit value for operating the steering device to be changed,
the controlling of the control timing of the steering device to be changed comprises controlling the control timing of the steering device to be advanced by a preset time compared to an existing control timing, and
the controlling of the lateral distance limit value for operating the steering device to be changed comprises changing the lateral distance limit value to a value smaller than an existing lateral distance limit value.

2. The driver assistance apparatus according to claim 1, wherein, when the driver's gaze is not in front, the controller determines that the driver is in the careless condition, and controls the control timing of the steering device to be advanced by the preset time compared to the existing control timing.

3. The driver assistance apparatus according to claim 1, wherein, when the driver's gaze is not in front, the controller determines that the driver is in the careless condition, and changes the lateral distance limit value to the value smaller than the existing lateral distance limit value, wherein the lateral distance limit value is a reference value compared with a lateral position error, which is a distance between a center point of the vehicle from a center of a driving lane, and the controller performs a steering control when the lateral position error exceeds the lateral distance limit value.

4. The driver assistance apparatus according to claim 1, wherein, when an object detected from an outside of the vehicle exists within a gaze area of the driver, the controller determines that the driver is not in the careless condition, and does not intervene in control of the steering device.

5. The driver assistance apparatus according to claim 1, wherein, when an object detected from an outside of the vehicle does not exist within a gaze area of the driver, the controller determines that the driver is in the careless condition.

6. The driver assistance apparatus according to claim 1, wherein the internal camera is configured to obtain the gaze data based on a face direction and a pupil direction of the driver.

7. The driver assistance apparatus according to claim 1, further comprising:
the steering device configured to change a driving direction of the vehicle,
wherein the steering device changes the driving direction of the vehicle according to a control signal changed by the controller.

8. The driver assistance apparatus according to claim 1, further comprising:
a brake device configured to decelerate the vehicle or stop the vehicle,
wherein, when the driver's gaze is not in front, the controller determines that the driver is in the careless condition, and controls a control timing of the brake device to be advanced by a preset time compared to an existing control timing.

9. The driver assistance apparatus according to claim 1, further comprising:
a brake device configured to decelerate the vehicle or stop the vehicle,
wherein, when the driver's gaze is not in front, the controller determines that the driver is in the careless condition, and controls a braking torque amount of the brake device to be higher than an existing braking torque amount.

10. A method of controlling a driver assistance apparatus comprising:
obtaining, by an external camera, image data on an outer field of view of a vehicle;
obtaining, by an internal camera, gaze data of a driver on board so as to grasp a driver's gaze;
grasping, by a controller, the driver's gaze based on the gaze data; and
upon determining that the driver is in a careless condition, performing, by the controller, at least one of controlling a control timing of a steering device to be changed or controlling a lateral distance limit value for operating the steering device to be changed,
wherein the controlling of the control timing of the steering device to be changed comprises controlling the control timing of the steering device to be advanced by a preset time compared to an existing control timing, and
the controlling of the lateral distance limit value for operating the steering device to be changed comprises changing the lateral distance limit value to a value smaller than an existing lateral distance limit value.

11. The method according to claim 10, wherein the performing comprises:
when the driver's gaze is not in front, determining that the driver is in the careless condition, and controlling the control timing of the steering device to be advanced by the preset time compared to the existing control timing.

12. The method according to claim 10, wherein the performing comprises:
when the driver's gaze is not in front, determining that the driver is in the careless condition, and changing the lateral distance limit value to the value smaller than the existing lateral distance limit value.

13. The method according to claim 10, wherein the performing comprises:
when an object detected from an outside of the vehicle exists within a gaze area of the driver, determining that the driver is not in the careless condition, and not intervening in control of the steering device.

14. The method according to claim 10, wherein the performing comprises:

when an object detected from an outside of the vehicle does not exist within a gaze area of the driver, determining that the driver is in the careless condition.

15. The method according to claim 10, wherein the gaze data comprises information about a face direction and a pupil direction of the driver.

16. The method according to claim 10, further comprising:
controlling the steering device to change a driving direction of the vehicle according to a changed control signal for advancing the control timing of the steering device or for changing the lateral distance limit value.

17. The method according to claim 10, further comprising:
when the driver's gaze is not in front, determining that the driver is in the careless condition, and controlling a control timing of a brake device for decelerating or stopping the vehicle to be advanced by a preset time compared to an existing control timing.

18. The method according to claim 10, further comprising:
when the driver's gaze is not in front, determining that the driver is in the careless condition, and controlling a braking torque amount of a brake device for decelerating or stopping the vehicle to be higher than an existing braking torque amount.

19. A non-transitory computer readable medium containing program instructions executed by a processor, wherein execution of the program instructions causes the processor to:
obtain, by an external camera, image data on an outer field of view of a vehicle;
obtain, by an internal camera, gaze data of a driver on board so as to grasp a driver's gaze;
grasp, by a controller, the driver's gaze based on the gaze data; and
upon determining that the driver is in a careless condition, perform, by the controller, at least one of controlling a control timing of a steering device to be changed or controlling a lateral distance limit value for operating the steering device to be changed,
wherein the controlling of the control timing of the steering device to be changed comprises controlling the control timing of the steering device to be advanced by a preset time compared to an existing control timing, and
the controlling of the lateral distance limit value for operating the steering device to be changed comprises changing the lateral distance limit value to a value smaller than an existing lateral distance limit value.

20. The computer readable medium according to claim 19, wherein the execution of the program instructions causes the processor to:
when the driver's gaze is not in front, determine that the driver is in the careless condition, and change the lateral distance limit value to the value smaller than the existing lateral distance limit value, wherein the lateral distance limit value is a reference value compared with a lateral position error, which is a distance between a center point of the vehicle from a center of a driving lane, and the controller performs a steering control when the lateral position error exceeds the lateral distance limit value.

* * * * *